(12) United States Patent
Iott et al.

(10) Patent No.: US 6,826,455 B1
(45) Date of Patent: Nov. 30, 2004

(54) BOOSTER-POWERED VALVE SYSTEM

(75) Inventors: Jeffrey J. Iott, Monroe, MI (US); Mohamad A. Khalil, Sterling Heights, MI (US)

(73) Assignee: Masco Corporation, Taylor, MI (US)

( * ) Notice: Subject to any disclaimer, the term of this patent is extended or adjusted under 35 U.S.C. 154(b) by 0 days.

(21) Appl. No.: 10/434,704

(22) Filed: May 9, 2003

(51) Int. Cl.[7] .............................................. G05D 9/00
(52) U.S. Cl. ...................... 700/297; 323/222; 323/282
(58) Field of Search ............................... 323/222, 282; 303/115.2; 700/282, 297

(56) References Cited

U.S. PATENT DOCUMENTS

| 3,547,154 | A |   | 12/1970 | Benham |         |
|-----------|---|---|---------|--------|---------|
| 5,207,380 | A |   | 5/1993  | Harryman |       |
| 5,315,787 | A |   | 5/1994  | Schleicher et al. | |
| 5,340,025 | A |   | 8/1994  | Pearce |         |
| 5,450,000 | A | * | 9/1995  | Olsen  | 323/282 |
| 5,712,536 | A | * | 1/1998  | Haas et al. | 323/222 |
| 5,819,336 | A |   | 10/1998 | Gilliam et al. | |
| 5,973,482 | A | * | 10/1999 | Meinert | 322/86 |
| 6,126,141 | A |   | 10/2000 | Geiger |         |
| 6,377,481 | B1 | * | 4/2002 | Mantov | 323/282 |

FOREIGN PATENT DOCUMENTS

| JP | 10184973   | 7/1998  |
| JP | 11141721   | 5/1999  |
| JP | 11344146   | 12/1999 |
| JP | 2001065973 | 3/2001  |

* cited by examiner

*Primary Examiner*—Albert W. Paladini
(74) *Attorney, Agent, or Firm*—Woodard, Emhardt, Moriarty, McNett & Henry LLP (57) ABSTRACT

A booster-enhanced power supply for a valve control circuit is disclosed. An inductor repeatedly stores energy from a power source, then discharges it through a diode into a capacitor due to the cycling on and off of a switch. The charged capacitor is used as the power source for changing the state of the valve. The charge stored on the capacitor(s) at any given moment is preferably monitored, and the charging cycle is preferably controlled to optimize the use of the boosting circuit for a given application. The boosted power source can provide a consistent output even when the power source provides an consistent power output even when the power source provides an inconsistent power input.

24 Claims, 7 Drawing Sheets

BOOSTER-POWERED VALVE SYSTEM

BACKGROUND

Portions of this patent application include materials that are subject to copyright protection. The copyright owner has no objection to the facsimile reproduction by anyone of the patent document itself, or of the patent application, as it appears in the files of the United States Patent and Trademark Office, but otherwise reserves all copyright rights whatsoever in such included copyrighted materials.

The present invention relates to fluid valves. More specifically, the present invention relates to power circuits for activating and deactivating fluid valves.

Electrically actuated fluid valves are used in many applications, such as for battery-powered faucet valves, for example. These designs present certain design challenges, however, that make the designs difficult to optimize. In battery-powered faucets that use solenoid-latch valves, the energy required to change the state of the valve is substantial. If such a system is designed to use the whole peak output of the battery, its performance begins to deteriorate soon after the battery strength drains to the point where its peak output diminishes. Alternatively, if the system is designed to use less actuation energy, its performance relative to the supply power is lower from the outset. There is thus a need for higher-performance valve control and power electronics that provide and maintain a high level of performance even after the peak output power of the battery begins to diminish.

SUMMARY

It is one object of the present invention to provide an improved valve power control arrangement. It is another object of the invention to improve the power circuitry for electrically powered valves.

These objects and others are accomplished by a circuit including a power supply, booster circuitry, and valve control components, where the booster circuit stores energy in one or more capacitors by repeatedly storing energy in an inductor, then discharging the energy through a diode to one or more capacitors. The capacitors are then discharged through the valve control solenoid to change the state of the valve.

In some variations in this embodiment, the charge stored on the capacitors is monitored, and the cycling of the booster circuit is controlled based on the amount of that charge.

In other variations of this embodiment, a transistor is switched on and off to store and release the energy from the inductor.

In still other variations, the capacitors are periodically re-boosted. This compensates for leakage of charge from the capacitor with time, and improves the response time when the valve eventually needs to be actuated.

DESCRIPTION OF THE PREFERRED EMBODIMENT

For the purpose of promoting an understanding of the principles of the present invention, reference will now be made to the embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Figure 1:
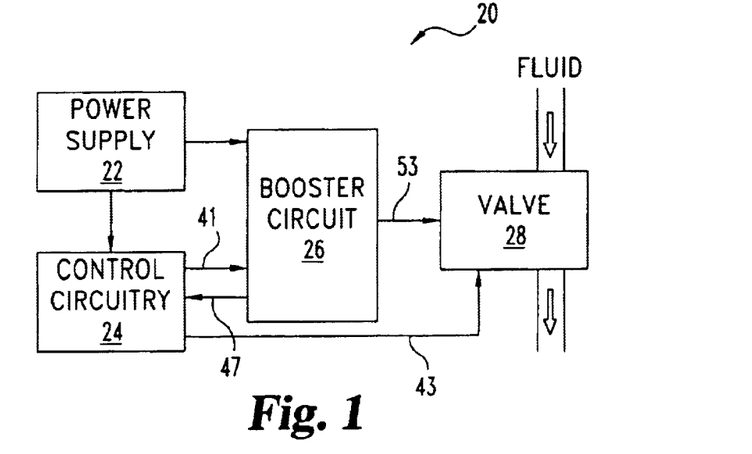
FIG. 1 is a block diagram of a valve with its power and control circuitry according to the present invention.

Generally, the system shown in FIG. 1 provides boosted power from a power supply to an electrically actuated valve through control and booster circuitry. The booster circuitry stores energy from the power supply on one or more capacitors, accumulating more potential than the power supply could provide on its own.

In particular, in this example embodiment, system 20 comprises power source 22, control circuitry 24, booster circuit 26, and valve 28. In this example, power source 22 comprises four dry cells, such as those of standard sizes AAA, AA, C, or D. Where a plurality of cells are used, they are preferably configured in series to provide a total electrical potential equal to the sum of the potentials provided by each cell.

Valve 28, in this example, is a solenoid-latched water valve, such as model 612–268, manufactured and distributed by Evolutionary Concepts, Inc. Other valves may be used as desired or necessary given the design parameters of other systems.

Figure 2:
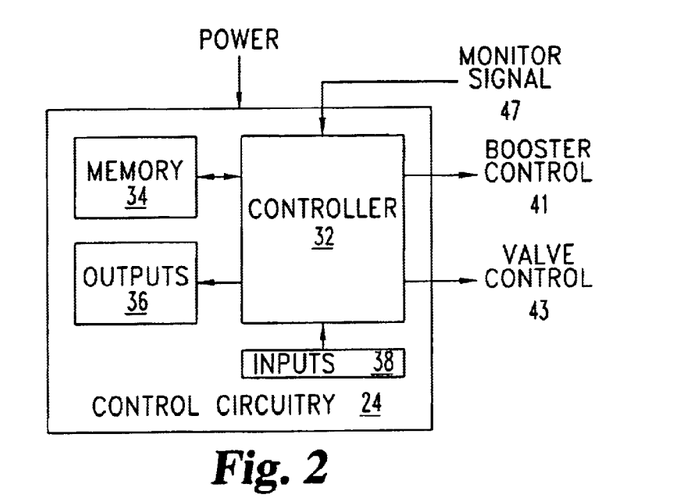
FIG. 2 is a block diagram of control circuit according to one embodiment of the present invention

Turning now to FIG. 2, further details regarding control circuitry 24 will be discussed with reference to components in FIG. 1. In this embodiment, control circuitry 24 comprises controller 32, memory 34, one or more optional output devices 36, and one or more optional input devices 38. Power, ground, clock, sensors, and other signals and circuitry are not shown for clarity, but will be understood and easily implemented by those who are skilled in the art.

Controller 32 is preferably a microcontroller, that reads its program from memory 34. The program operates to generate the booster control signal 41 that is used by booster circuit 26 as discussed below, as well as valve control signal 43 that actuates valve 28. Optional output devices 36 preferably include one or more output devices such as LEDs, LCDs, or audio output devices, or a combination of types, though other output devices and techniques could be used as would occur to one skilled in the art. Likewise, optional input devices 38 may include push-buttons, UARTs, IR and/or RF receivers, decoders, or other devices. In this exemplary embodiment, controller 32 is an Atmega8L-8AC microcontroller made and sold by Atmel Corporation. In alternative embodiments, one or more application-specific integrated circuits (ASICs), general-purpose microprocessors, programmable logic arrays, or other devices may be used as would occur to one skilled in the art.

Likewise, memory 34 can include one or more types of solid-state electronic memory, magnetic memory, or optical memory, just to name a few. By way of non-limiting example, memory 34 can include solid-state electronic Random Access Memory (RAM), Sequentially Accessible Memory (SAM) (such as the First-In, First-Out (FIFO) variety or the Last-In First-Out (LIFO) variety), Programmable Read Only Memory (PROM), Electrically Programmable Read Only Memory (EPROM), or Electrically Erasable Programmable Read Only Memory (EEPROM); an optical disc memory (such as a recordable, rewritable, or read-only DVD or CD-ROM); a magnetically encoded hard disk, floppy disk, tape, or cartridge media; or a combination of any of these memory types. Also, memory 34 can be volatile, nonvolatile, or a hybrid combination of volatile and nonvolatile varieties.

Figure 3:
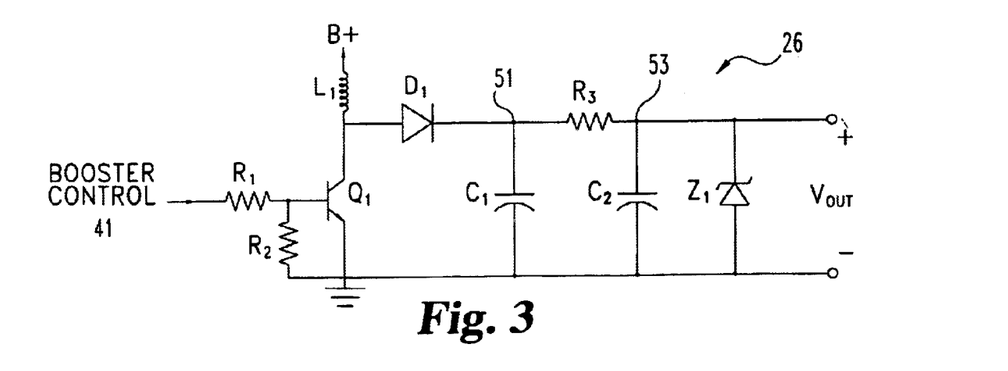
FIG. 3 is a schematic diagram of a booster circuit for use in the present invention.

FIG. 3 illustrates an exemplary boosting circuit for use with the present invention, such as for booster circuit 26 in FIG. 1. Power is supplied to the circuit between terminals B+ and ground, which in this example correspond to the positive and negative terminals of power supply 22. Generally, this power source charges capacitors $C_1$ and $C_2$, which in turn provide power to valve 28 upon triggering of a change in valve state by control circuitry 24 through booster control signal 41.

More particularly, the charging cycle begins with raising of booster control signal 41, which turns on transistor $Q_1$, which in various embodiments is a bipolar transistor, a MOSFET, or (in some small current applications) a transistor internal to microcontroller 32. This provides a low-impedance path from the lower terminal of inductor $L_1$ to ground. Inductor $L_1$ converts the resulting current into a magnetic field. After a short delay, booster control signal 41 is then brought to a low potential, turning off transistor $Q_1$. Inductor $L_1$ then converts the stored energy (in the form of the magnetic field) into current, which flows through diode $D_1$ to junction 51. A small amount of this current is stored as charge on capacitor $C_1$, which acts as a filter, while a much larger portion of this current flows through resistor $R_3$ to junction 53 and is stored on capacitor $C_2$. This cycle is repeated as necessary to sufficiently charge capacitors $C_1$ and $C_2$ for discharging into valve 28 for a particular application. Zener diode $Z_1$ prevents capacitors $C_1$ and $C_2$ from overcharging.

In some alternative embodiments, booster circuit 26 also provides a monitor/feedback signal 47 (see FIG. 1) to control circuitry 24, which is further programmed to generate pulses on booster control signal 41 at desired times so that valve 28 can be actuated in a timely response to system demand. In some embodiments, signal 47 is an analog or digital signal that reflects the present potential on C1 and/or C2.

Figure 4:
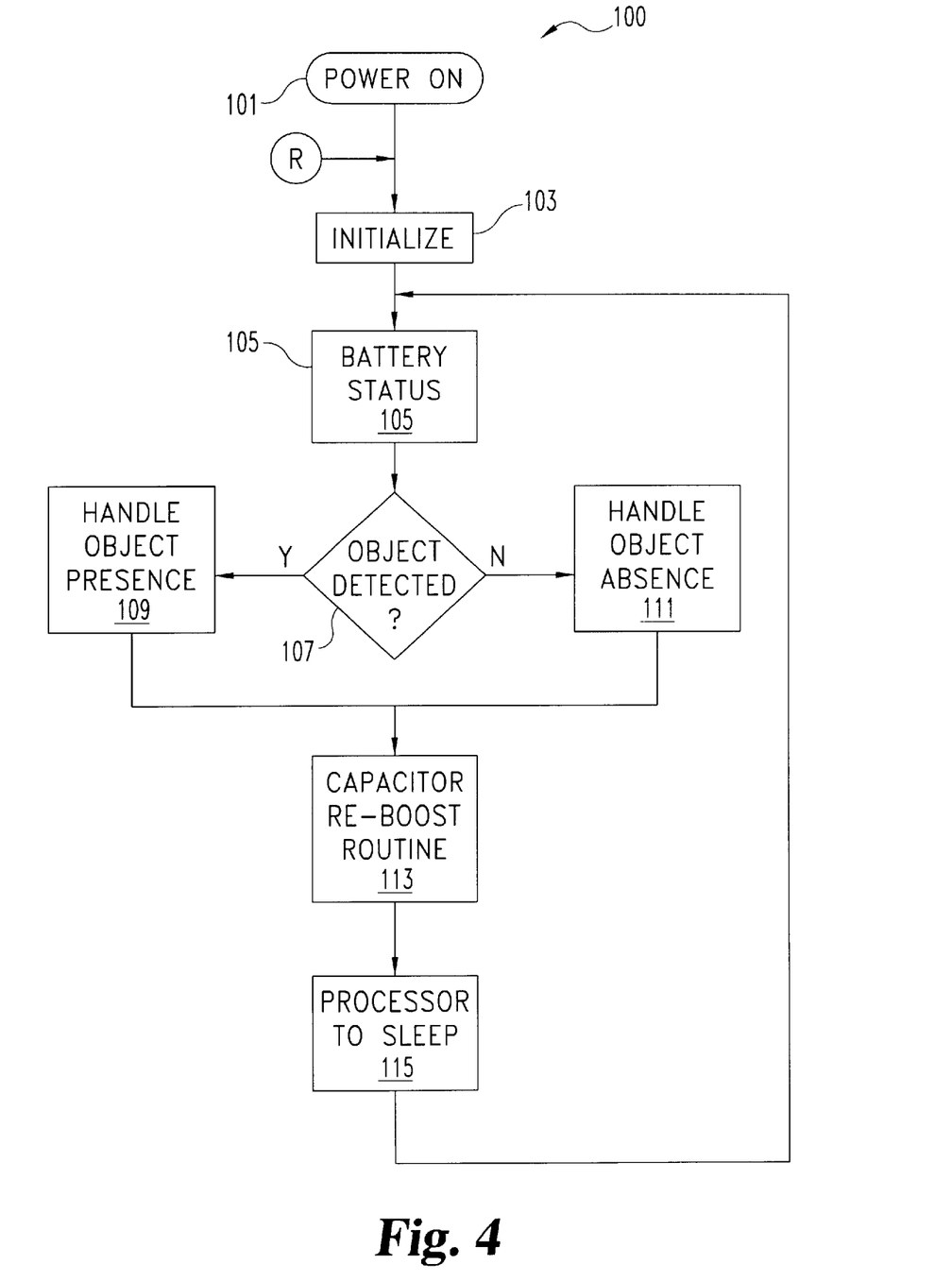
FIG. 4 is a flowchart of programming for control circuitry according to one embodiment of the present invention.

One example of a process that can be followed by control circuitry 24 for controlling system 20 will now be discussed in relation to FIGS. 4–9. FIG. 4 illustrates the overall process 100, beginning with the power-on event 101. (Reference point R will be discussed below in relation to FIG. 5.) The system is initialized at block 103, including tasks such as configuring I/O ports, defining variables and constants, establishing initial values for the system, forcing the valve to an off position, and announcing to the system of electronics that the control system is ready for operation. In this example, this initialization includes the code seen below under the heading "Initialization software associated with the boost feature."

The battery status is checked at step 105, which check will be further discussed in relation to FIG. 5 below.

The system checks for objects being present at decision block 107 using techniques that will be understood by those skilled in the art. If an object is present, that presence is handled at step 109. If no object is present, that situation is handled at step 111. In either event, the processing loop continues with time-based re-boost check routine 113 (see below in relation to FIG. 8), and the processor is put to sleep at step 115. At an appropriate time (such as after the processor has slept for a predetermined period of time, or upon receiving a regular timer-based interrupt, for example), the process 100 returns to step 105 to check the battery status once more.

Figure 5:
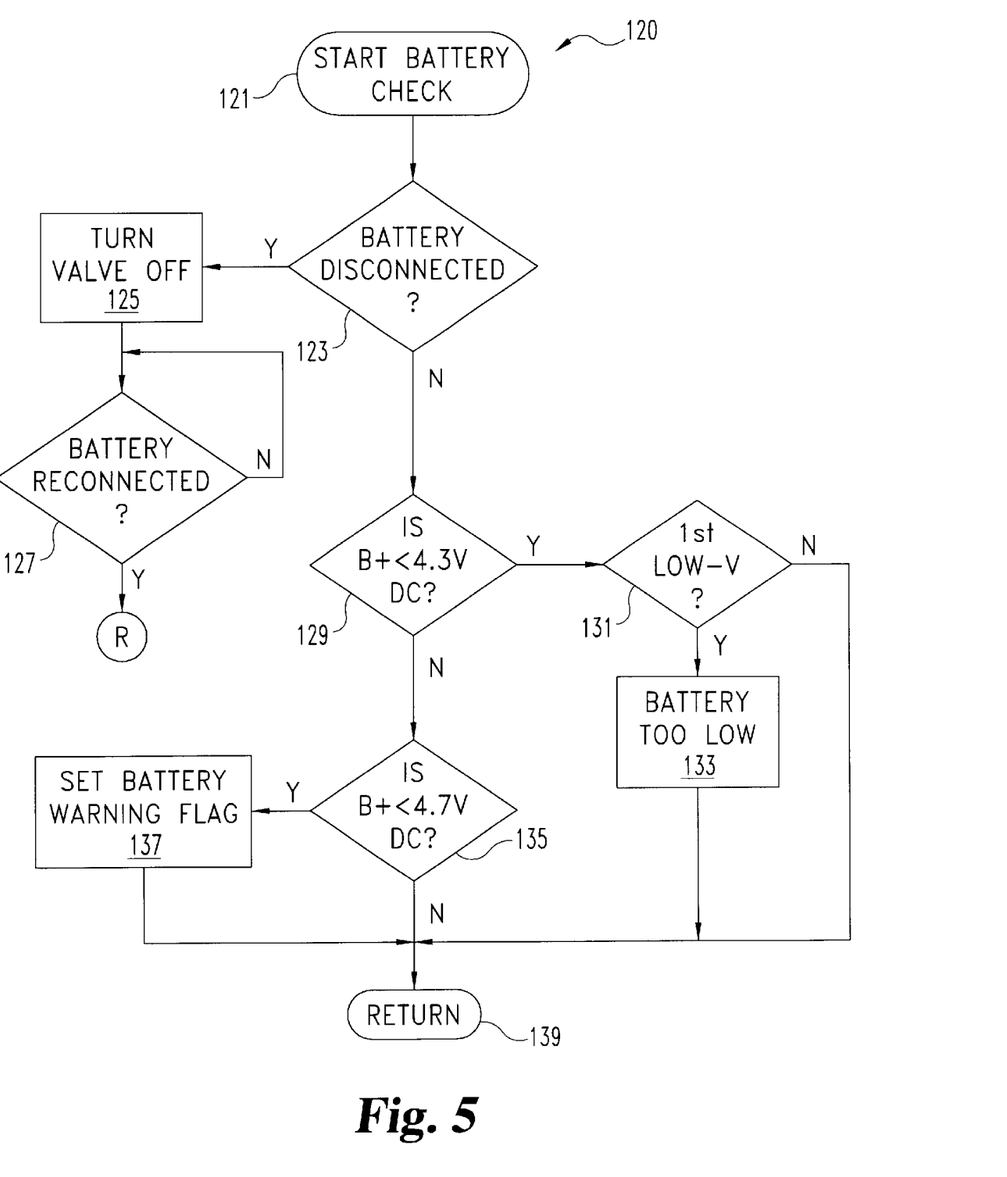
FIG. 5 is a flowchart of a routine for checking and responding to the battery level in one embodiment of the present invention.

Turning now to FIG. 5, the process 120 for checking the battery level will be discussed beginning with start point 121. It is first determined at decision block 123 whether the power supply 22 has been disconnected. If so, the system turns the valve off at step 125, then waits at decision block 127 for the battery to be reconnected. When it is, the process continues at reference point R in FIG. 4. If the battery is not reconnected, the processor will eventually cease to operate, and no decision on reconnection can be made. When the battery is connected again, operation will start at reference point R.

If the battery is not disconnected (a negative result at decision block 123), the system checks whether its output voltage is less than 4.3 VDC at decision block 129. If so, the system determines at decision block 131 whether this is the first low-voltage iteration. If so, the system handles the low-battery condition at step 133 by, for example, turning the valve off, announcing to the system that the battery is low, and setting the "disable" flag. Then, or after a negative result at decision block 131, the system returns from the battery check routine 120 at return point 139. If the battery output is not less than 4.3 VDC (i.e., a negative result at decision block 129), the system checks at decision block 135 whether the battery output voltage is less than 4.7 VDC. If so, the system sets the "warning" flag at step 137, then returns at return point 139. If not, the system returns immediately.

Figure 6:
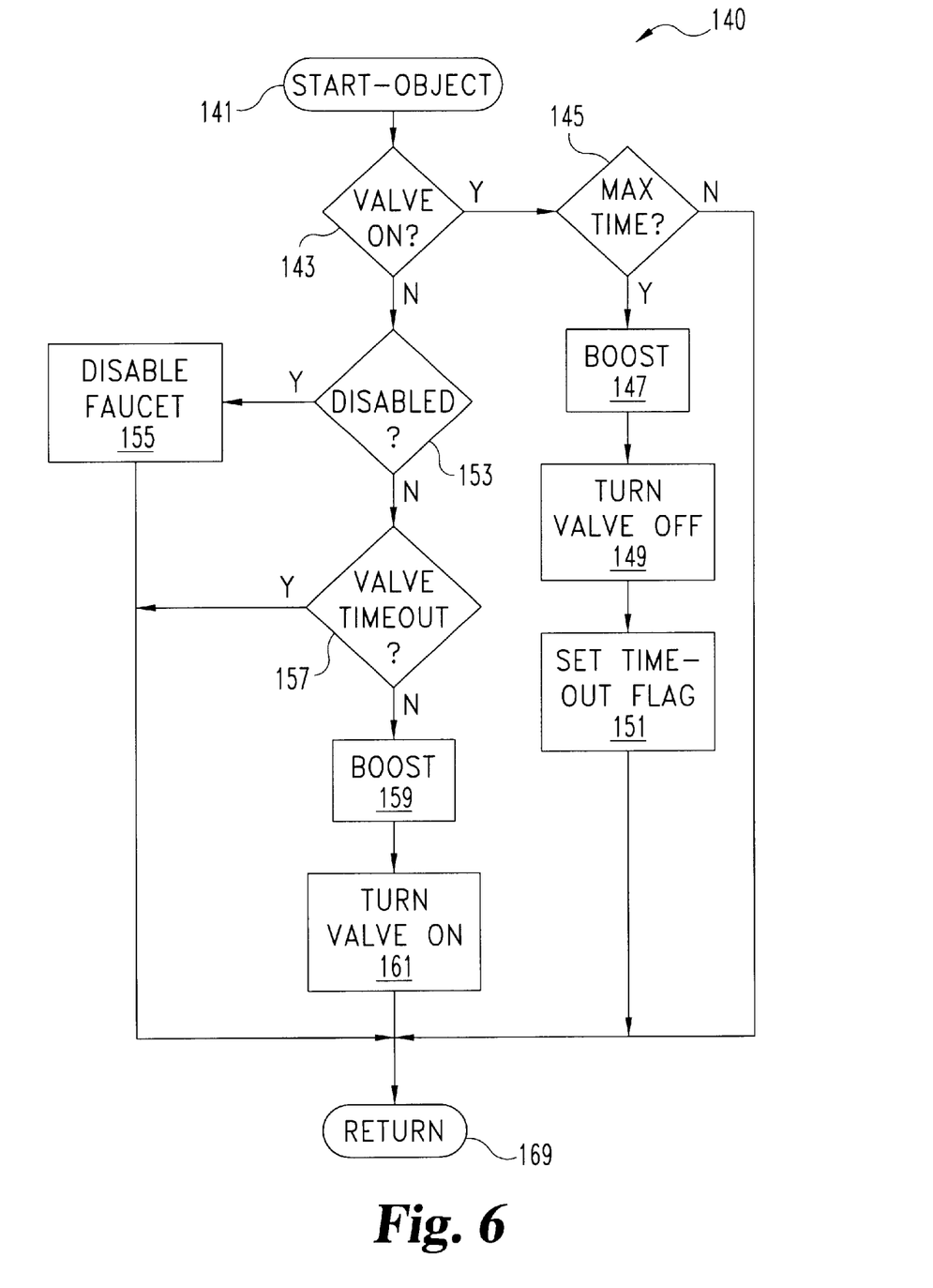
FIG. 6 is a flowchart of a routine for handling the presence of an object in one embodiment of the present invention.

An exemplary routine 140 for handling the presence of an object (see above at step 109 in FIG. 4) is illustrated in FIG. 6, beginning at start point 141. The system checks at decision block 143 whether the valve is in an "on" state. If so, the system checks at decision block 145 whether the maximum allowable running time has been reached. If it has not, the routine 140 returns at return point 169.

If the maximum running time has been reached (i.e., a positive result at decision block 145), the system initiates a boost cycle (routine 210, below, in relation to FIG. 9) at step 147, then turns the valve off at step 149, and sets the "time-out" flag at step 151. Routine 141 then returns at return point 169.

If, on the other hand, the system determines at decision block 143 that the valve is not on, the system tests at decision block 153 whether the "disable" flag is set. If so, the system disables the faucet at step 155 by turning the valve off and announcing the low battery condition, then return point 169. If not (i.e., the system has not been disabled), the system checks at decision block 157 whether the "time-out"

flag has been set. If the "time-out" flag has been set, the system returns at return point 169. If the time-out flag has not been set, the system initiates a boost cycle at step 159, then turns the valve on at step 161 and returns at return point 169.

Figure 7:
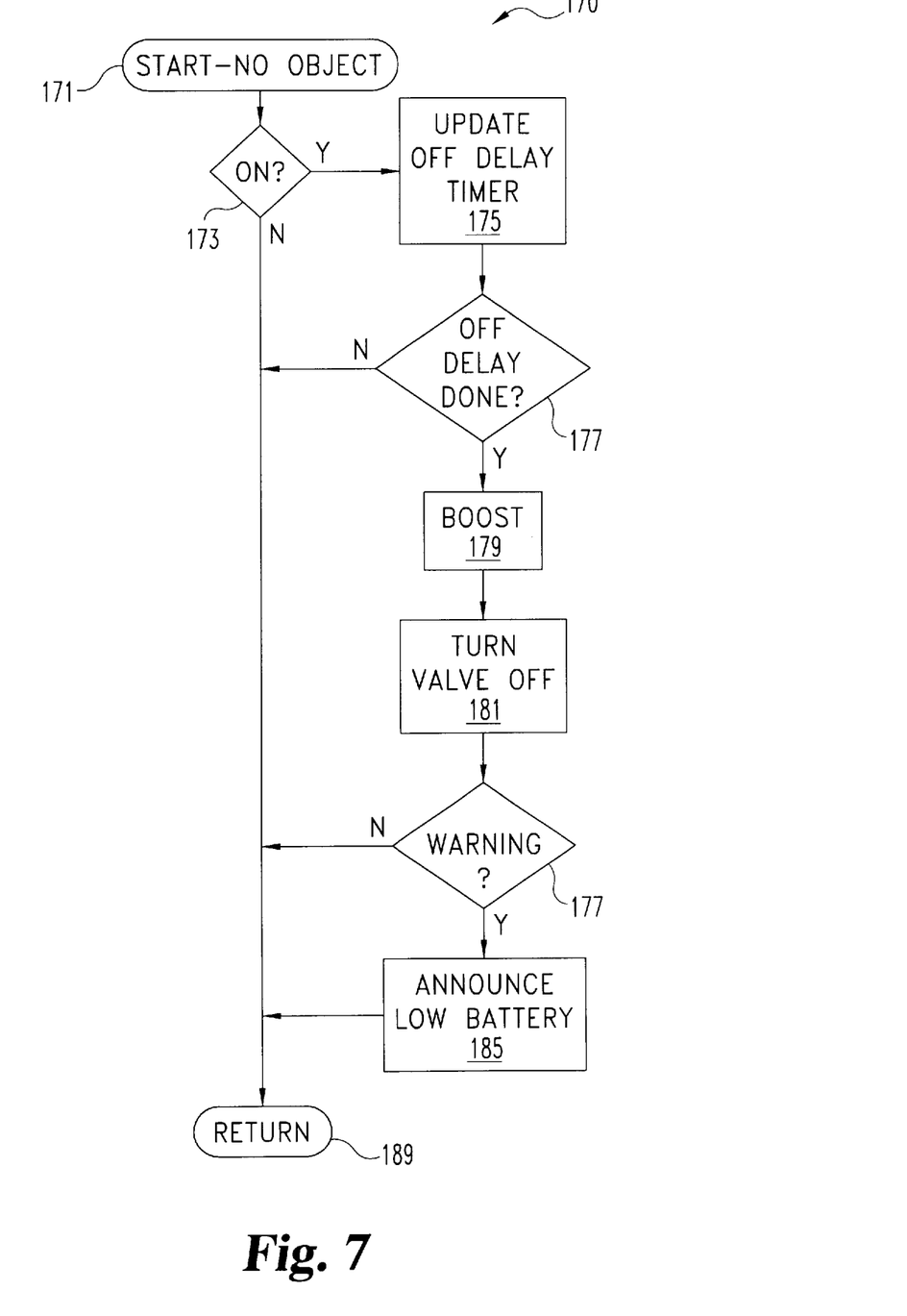
FIG. 7 is a flowchart of a routine for handling the absence of an object in one embodiment of the present invention.

Routine 170, illustrated in FIG. 7, handles the absence of an object beginning at start point 171. At decision block 173, it is determined whether the valve is on. If not, routine 170 returns at return point 189. If so, the system updates an "OffDelay" timer at step 175. The system then checks at decision block 177 whether a threshold (four seconds, for example) for the "OffDelay" timer has been exceeded. If it has not, the system returns at return point 189. If the "OffDelay" threshold has been exceeded (i.e., a positive result at decision block 177), the system calls the boost routine at step 179, then turns the valve off at step 181.

The system then checks at decision block 183 whether the "warning" flag has been set. If not, the system returns at return point 189. If so, the system announces the low-battery condition at step 185, then returns at return point 189.

Figure 8:
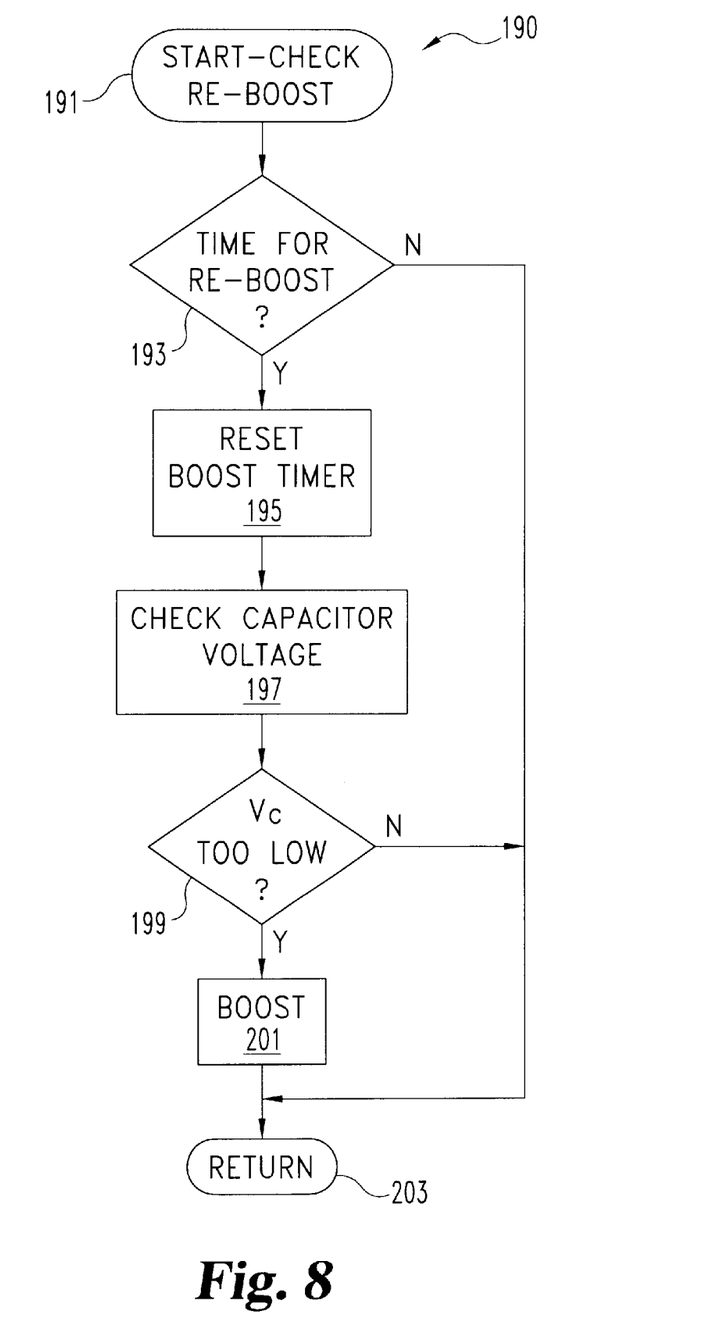
FIG. 8 is a flowchart of a routine for determining whether to provide a time-based boost of the capacitor voltage in one embodiment of the present invention.
Figure 9:
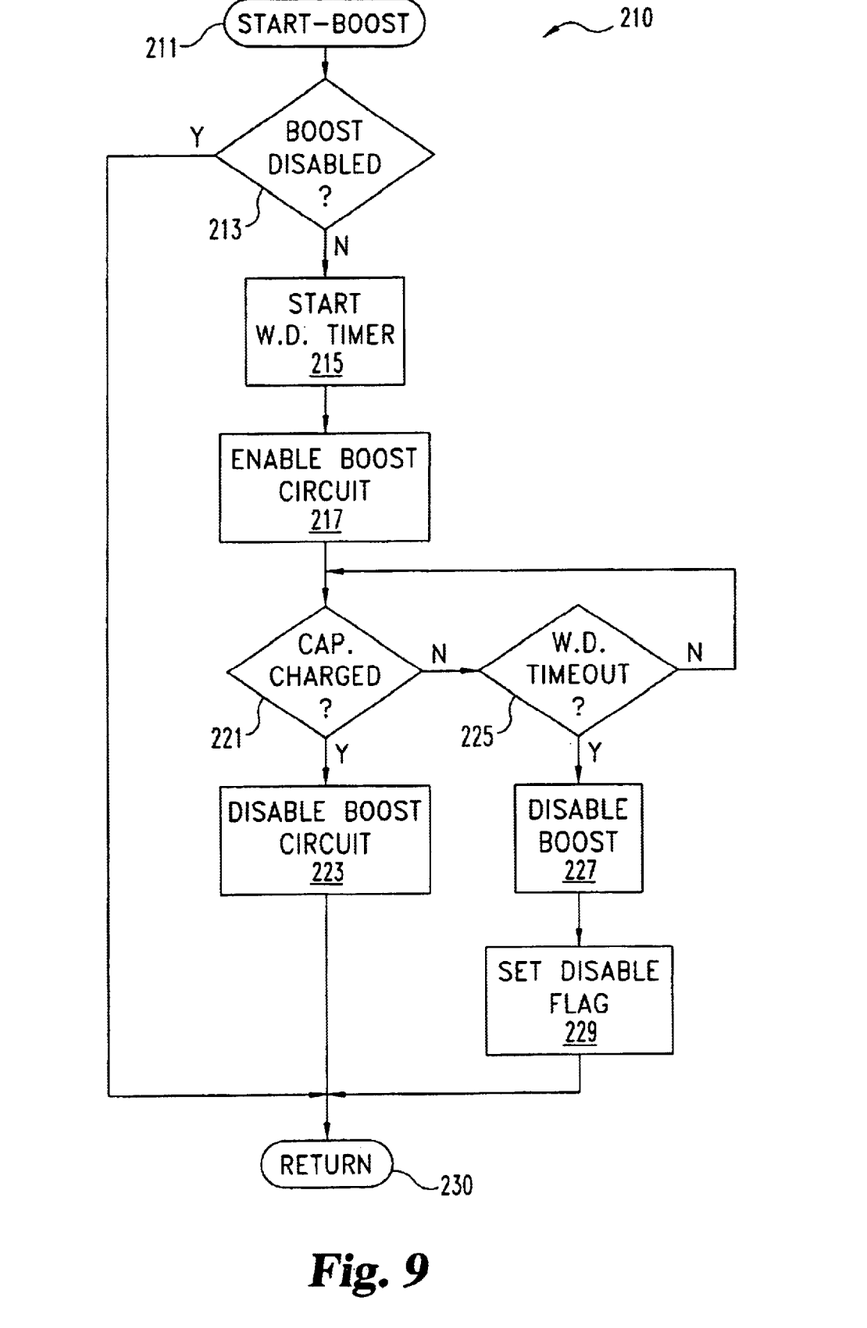
FIG. 9 is a flowchart of a routine for controlling a boost process according to one embodiment of the present invention.

A routine 190 for determining whether a time-based boost is appropriate will now be discussed in relation to FIG. 8, starting at start point 191. The present example embodiment of the inventive boost technique boosts the capacitor power and actuates the valve only on demand, which introduces a delay in the operation of the valve. The magnitude of the delay is therefore a function of the difference between the battery voltage B+ and the desired output potential. Although $C_2$ is re-boosted after each operation of the valve, the level of voltage at $V_{out}$ will eventually decrease due to leakage to a level equal to B+. In order to minimize this delay, a time-triggered boost function is periodically performed. The system checks at decision block 193 whether it is time for a periodic boost. If not, the routine 190 returns at return point 203. If so, the system resets the boost timer (to five minutes, for example) at step 195, then checks the capacitor voltage $V_{out}$ at step 197. Then, at decision block 199, it is determined whether the capacitor voltage is below a minimum threshold. If not, the system returns at return point 203. If so, the system calls the boost routine at step 201, then returns at return point 203. A software implementation of routine 190 in the example embodiment follows this description under the heading "Boost Control Subroutines." FIG. 9 illustrates routine 210 for processing a capacitor boost, beginning at start point 211. The system determines at decision block 213 whether the "disable" flag has been set. If so, the routine 210 returns immediately at return point 230.

If not, a watchdog timer is started at step 215, then cycling of the boost circuit is enabled at step 217. The booster circuit raises and lowers booster control signal 41 as discussed above in relation to FIGS. 1–3, with high and low voltages, duty cycle, and frequency as appropriate in the particular system.

Then the system checks at decision block 221 whether the capacitor voltage is at or above the desired potential. If so, cycling of the boost circuit is disabled at step 223, and the routine 210 returns at return point 230. The check at decision block 221 is performed in the example embodiment by the code sample below under the heading "Subroutine to monitor boosted capacitor's voltage level."

If the capacitor is not yet charged to the desired voltage (i.e., negative result at decision block 221), the system determines at decision block 225 whether the watchdog timer has timed out. If not, routine 210 returns to decision block 221. If so, cycling of the boost circuit is disabled at step 227, the "disable" flag is set at step 229, and routine 210 returns at return point 230.

One exemplary set of software routines is presented below for use with the microprocessor and other design parameters discussed above. Again, this disclosure is not the only way to implement this invention, and therefore is not limiting.

```
Initialization software associated with the boost feature.
;  ---------------------------------------------------------------
;  TIMER 1 SETTING CONSTANTS
;  REFER TO ATmega8L DOCUMENTATION FOR MORE DETAILS ON TIMER1
;  OPERATION IN FAST PWM.
;
;  TO KEEP THE OPERATION OF THE BOOST CIRCUIT IN
;  DISCONTINUOUS MODE, THE SWITCHING FREQUENCY OF THE COIL
;  MUST MEET THE FOLLOWING EQUATION:
;
;                          R x D x (1-D) ^ 2
;               Fs <= -------------------
;                              2 x L
;
;  WHERE:
;  R IS THE LOAD RESISTANCE. SINCE A CURRENT SOURCE IS USED AS
;  THE CHARGING CIRCUIT AND THE VOLTAGE AND CURRENT SETTINGS
;  ARE 10 V AND 30 mA RESPECTIVELY, THE EQUIVALENT RESISTANCE
;  VALUE IS 10 V/30 mA = ~333 Ohm.
;  D IS THE DUTY CYCLE. IT IS COMPUTED AS FOLLOWS:
;            Vi
;     Vo = --------   WHERE Vo = 10 V REQUIRED FOR CURRENT SOURCE
;          (1 - D)
;  THE WORST CASE SCENARIO IS WHEN THE BATTERY LEVEL IS AT
;  THE LOW LIMIT OF 4.15 VOLTS. FROM THE ABOVE EQUATION D IS
;  COMPUTED AS 0.585. THE MAXIMUM FREQUENCY FOR KEEPING
;  THE BOOST CIRCUIT IN DISCONTINUOUS MODE IS THEN 356.917 kHz
;  THE NEAREST (TOP) VALUE THAT GIVES A FREQUENCY LESS THAN
;  THE COMPUTED ONE (GIVEN A PROCESSOR OPERATING FREQUENCY
;  OF 8 MHz) IS 23 FOR A BOOSTER FREQUENCY OF 347.826 kHz.
```

-continued

```
;   FROM THE FREQUENCY ABOVE, THE COUNT FOR THE OCR1A                                              ;
;   REGISTER THAT SETS THE DUTY CYCLE WILL BE 0.585 × 23.                                          ;
;   THE VALUE CHOSEN IS 14 FOR AN EFFECTIVE DUTY CYCLE OF ~0.60                                    ;
;   AND AN OUTPUT VOLTAGE OF 10.6 V.                                                               ;
;   --------------------------------------------------------------                                 ;
.EQU  TCCR1A_DEFAULTS   = 0B00000010      ; 00xxxxxx  : NORMAL OPERATION BY DEFAULT - OC1A DISCONNECTED
                                          ; xx00xxxx  : DON'T CARE
                                          ; xxxx00xx  : DON'T CARE
                                          ; xxxxxx10  : FAST PWM, ICR1 = TOP, OCR1A = COMPARE VALUE
.EQU  OC1A_MODE         = 0B11000000      ; OPERATION MODE MASK
.EQU  OC1A_DISCONNECT   = 0B00000000      ; SETTING TO DISCONNECT OC1 FROM BOOST SWITCH
.EQU  OC1A_CONNECT      = 0B10000000      ; OC1A CONNECTED TO BOOST SWITCH
.EQU  TCCR1B_DEFAULTS   = 0B00011001      ; 000xxxxx  : NOT USED
                                          ; xxx11xxx  : FAST PWM, ICR1 = TOP, OCR1A = COMPARE VALUE
                                          ; xxxxx001  : TIMER1 SCALER - NO PRESCALING - USE PROCESSOR CLOCK
.EQU  BOOSTER_FREQUENCY = 30              ; VALUE TO SET BOOSTER SWITCHING FREQUENCY IN ICR1
.EQU  BOOSTER_DUTY_CYCLE = 11             ; VALUE TO SET BOOSTER SWITCHING DUTY CYCLE IN OCR1A
;   --------------------------------------------------------------                                 ;
;   ADC RELATED CONSTANTS AND DEFINITIONS                                                          ;
;   --------------------------------------------------------------                                 ;
.EQU  ADMUX_DEFAULTS    = 0B01101111      ; 01xxxxxx  : REFERENCE SELECTION - AVCC
                                          ; xx1xxxxx  : ADLAR--RESULT OF CONVERSION LEFT JUSTIFIED TO 8 BIT
                                          ; xxxx1111  : MUX CHANNEL SELECTION - GROUND SELECTED BY DEFAULT
.EQU  ADCSR_DEFAULTS    = 0B00000110      ; 0xxxxxxx  ; ADEN - DISABLED BY DEFAULT
                                          ; x0xxxxxx  ; ADSC - CONVERSION START
                                          ; xx0xxxxx  ; ADFR - ADC FREE RUNNING - FREE RUNNING BY DEFAULT
                                          ; xxx-xxxx  ; ADIF - ADC INTERRUPT FLAG
                                          ; xxxx0xxx  ; ADIE - ADC INTERRUPT ENABLE
                                          ; xxxxx---  ; ADPS - ADC PRESCALER SELECTION
.EQU     ADC_CHANNELS   = 0B00001111      ; ANALOG MUX CHANNEL SELECTION BITS
                                          Boost Control Subroutines ;   * * * * * * * * * * * * * * * * * * * * * * * * * * * * * * * * * * * * * * * * * * * * * * *.
;   BOOST TIMING FUNCTIONS                                                                         ;
;   * * * * * * * * * * * * * * * * * * * * * * * * * * * * * * * * * * * * * * * * * * * * * * *.
;   --------------------------------------------------------------                                 ;
;   THIS FUNCTION INITIALIZED THE TIMER 1 USED TO CONTROL
;   THE CAPACITOR BOOST CIRCUIT.
;   --------------------------------------------------------------                                 ;
INITIALIZE_BOOST_TIMER:
        LDI    R16, TCCR1A_DEFAULTS            ; SET TCCR1A ACCORDING TO
        OUT    TCCR1A, R16                     ; SETTINGS IN TABLE ABOVE
        LDI    R16, TCCR1B_DEFAULTS            ; SET TCCR1B ACCORDING TO
        OUT    TCCR1B, R16                     ; SETTINGS IN TABLE ABOVE
        LDI    R16, HIGH(BOOSTER_FREQUENCY)    ; SET THE FREQUENCY OF THE
        OUT    ICR1H, R16                      ; BOOST CIRCUIT SWITCHING
        LDI    R16, LOW(BOOSTER_FREQUENCY)     ;
        OUT    ICR1L, R16                      ;
        LDI    R16, HIGH(BOOSTER_DUTY_CYCLE)   ; SET THE DUTY CYCLE OF THE
        OUT    OCR1AH, R16                     ; BOOST CIRCUIT SWITCHING
        LDI    R16, LOW(BOOSTER_DUTY_CYCLE)    ;
        OUT    OCR1AL, R16                     ;
        RET
;   --------------------------------------------------------------                                 ;
;   THIS FUNCTION CONTROLS THE CAPACITOR VOLTAGE                                                   ;
;   BOOST CIRCUIT. IT STARTS BY CHECKING THE CAPACITOR                                             ;
;   VOLTAGE AND IF FOUND TO BE AT THE DESIRED VALUE, IT RETURNS                                    ;
;   IMMEDIATELY OTHERWISE TURNS ON THE INDUCTIVE SWITCHING                                         ;
;   VOLTAGE BOOST CIRCUIT AND WAITS FOR THE CAPACITOR TO REACH                                     ;
;   ITS DESIRED LIMIT.                                                                             ;
;   --------------------------------------------------------------                                 ;
BOOST_CAPACITOR_VOLTAGE:
        PUSH   R18
        PUSH   R19
        SBRC   FLAGS, BOOST_DISABLE             ; IF BOOST CIRCUIT DISABLED
        RJMP   BCV_8                            ; .. CONTINUE
                                                 ; ELSE (BOOST CIRCUIT ENABLED)
        LDI    R18, CAPACITOR_CHANNEL            ; .. INDEX OF CHANNEL TO CONVERT
        CALL   READ_ADC_CHANNEL                  ; .. READ CAPACITOR VOLTAGE
        CPI    R18, BOOST_VOLTAGE_LIMIT          ; .. CHECK IF VOLTAGE ALREADY AT DESIRED SETTING
        BRSH   BCV_7                             ; .. IF VOLTAGE REQUIRES BOOSTING THEN
        LDI    R19, CAPACITOR_BOOST_COUNT        ; .... SET MAXIMUM TIME TO WAIT FOR VALVE CAPACITOR TO REACH
                                                 ;      BOOST VOLTAGE
        CALL   TURN_ON_BOOST_SWITCHING           ; .... TURN THE BOOST SWITCHING CIRCUIT ON
        CLC                                      ; .... PASS MSB OF TIMING DELAY AND
        LDI    R18, TIMING_RESOLUTION            ; .... WAIT SEGMENT TIME IN MILLISECONDS
        CALL   SET_MILLISECONDS_DELAY            ; .... INITIATE THE FIRST TIMING CYCLE
BCV_1;                                           ; .... DO
        LDI    R18, CAPACITOR_CHANNEL            ; ...... INDEX OF CHANNEL TO CONVERT
```

|  |  |  |  |
|---|---|---|---|
|  | CALL | READ_ADC_CHANNEL | ; . . . . . . READ CAPACITOR VOLTAGE |
|  | CPI | R18, BOOST_VOLTAGE_LIMIT | ; . . . . . . CHECK IF VOLTAGE ALREADY AT DESIRED SETTING |
|  | BRSH | BCV_6 | ; . . . . . . IF VOLTAGE STILL LOWER THAN DESIRED LIMIT |
|  | SBRS | FLAGS, TIME_ELAPSED | ; . . . . . . . . IF NEXT BOOST TIMEOUT PERIOD NOT ELAPSE YET |
|  | RJMP | BCV_5 | ; . . . . . . . . . . CONTINUE |
|  |  |  | ; . . . . . . . . ELSE (BOOST TIMEOUT PERIOD ELAPSED) |
|  | DEC | R19 | ; . . . . . . . . . . DECREMENT WAIT PERIOD COUNTER |
|  | BREQ | BCV_2 | ; . . . . . . . . . . IF BOOST CIRCUIT NOT TIMED OUT YET |
|  | CLC |  | ; . . . . . . . . . . . . PASS MSB OF TIMING DELAY AND |
|  | LDI | R18, TIMING_RESOLUTION | ; . . . . . . . . . . . . WAIT SEGMENT TIME IN MILLISECONDS |
|  | CALL | SET_MILLISECONDS_DELAY | ; . . . . . . . . . . . . INITIATE THE FIRST TIMING CYCLE |
|  | SEC |  | ; . . . . . . . . . . . . FORCE LOOP TO CONTINUE |
|  | RJMP | BCV_4 | ; . . . . . . . . . . CONTINUE |
| BCV_2: |  |  | ; . . . . . . . . . . ELSE (BOOST CIRCUIT TIMED OUT) |
|  | CALL | TURN_OFF_BOOST_SWITCHING | ; . . . . . . . . . . . . TURN BOOST CIRCUIT OFF |
|  | LDI | R19, BOOST_TIMEOUT_BEEP_COUNT | ; . . . . . . . . . . . . NUMBER OF BEEPS REQUIRED |
| BCV_3: |  |  | ; . . . . . . . . . . . . DO |
|  | LDI | R18, TIMING_RESOLUTION | ; . . . . . . . . . . . . . . AMOUNT OF TIME TO BEEP BUZZER FOR ONE PERIOD |
|  | CALL | BEEP_BUZZER | ; . . . . . . . . . . . . . . BEEP THE BUZZER |
|  | DEC | R19 | ; . . . . . . . . . . . . . . DECREMENT THE BEEP PERIOD COUNTER |
|  | BRNE | BCV_3 | ; . . . . . . . . . . . . LOOP UNTIL TOTAL BEEP TIME ELAPSED |
|  | SBR | FLAGS, (1<<BOOST_DISABLE) | ; . . . . . . . . . . . . DISABLE THE BOOST CIRCUIT |
|  | CLC |  | ; . . . . . . . . . . . . FORCE A LOOP EXIT |
| BCV_4: |  |  | ; . . . . . . . . . . END IF |
| BCV_5: |  |  | ; . . . . . . . . END IF |
| BCV_6: |  |  | ; . . . . . . END IF |
|  | BRCS | BCV_1 | ; . . . . LOOP UNTIL BOOST VOLTAGE REACHES LIMIT OR TIMEOUT |
|  | CALL | TURN_OFF_BOOST_SWITCHING | ; . . . . TURN BOOST CIRCUIT OFF |
| BCV_7: |  |  | ; . . END IF |
| BCV_8: |  |  | ; END IF |
|  | POP | R19 |  |
|  | POP | R18 |  |
|  | RET |  |  |

```
;   --------------------------------------------------------------         ;
;   THIS FUNCTION REFRESHES THE VALVE CAPACITOR VOLTAGE IF                  ;
;   NEEDED. IT RESETS A REFRESH TIMING COUNTER THEN CHECKS IF               ;
;   THE CAPACITOR VOLTAGE IS BELOW A CERTAIN VALUE AND IF SO                ;
;   INITIATES A NEW BOOST CYCLE.                                            ;
;   --------------------------------------------------------------         ;
REFRESH_BOOST_CAPACITOR:
        PUSH    R18
        LDI     R16, LOW(BOOST_PERIOD_COUNT)    ; RESET THE BOOST COUNTER USED FOR TIMING PERIODS BETWEEN
                                                ;     BOOSTS
        MOV     BOOST_PERIOD_COUNTERL, R16      ; FIRST THE LOW BYTE THEN
        LDI     R16, HIGH(BOOST_PERIOD_COUNT)   ; THE HIGH BYTE
        MOV     BOOST_PERIOD_COUNTERH, R16      ; DO IT INDIRECTLY BECAUSE REGISTER USED ARE IN R0–R15 HALF
        INC     BOOST_PERIOD_COUNTERH           ; BECAUSE WE DECREMENT ON ZERO AND NOT FF
        LDI     R18, CAPACITOR_CHANNEL          ; SET THE INDEX OF THE ADC CHANNEL TO CONVERT
        CALL    READ_ADC_CHANNEL                ;     READ CAPACITOR VOLTAGE
        CPI     R18, MINIMUM_REBOOST_LEVEL      ; CHECK IF VOLTAGE BELOW THE ALLOWED LIMIT
        BRSH    RBC_1                           ;     IF VOLTAGE REQUIRES BOOSTING THEN
        CALL    BOOST_CAPACITOR_VOLTAGE         ; . . BOOST THE CAPACITOR VOLTAGE
RBC_1:                                          ;     END IF
        POP     R18
        RET
```

Boost circuit switching control

```
;   --------------------------------------------------------------         ;
;   THIS FUNCTION TURNS ON THE BOOST SWITCHING CIRCUIT. IT SIMPLY           ;
;   TURNS THE TIMER1 ON SINCE IT HAS BEEN ALREADY SET AT POWER              ;
;   UP.                                                                    ;
;   --------------------------------------------------------------         ;
TURN_ON_BOOST_SWITCHING:
        IN      R16, TCCR1A             ; READ REGISTER CONTAINING TIMER1 PRESCALER
        ANDI    R16, ~OC1A_MODE         ; DISCONNECT THE PORT LINE FROM THE BOOST SWITCH
        ORI     R16, OC1A_CONNECT       ; IN ORDER TO CONNECT TO OC1A FROM TIMER 1
        OUT     TCCR1A, R16             ; BOOST SWITCHING IS ON . . . .
        RET
;   --------------------------------------------------------------         ;
;   THIS FUNCTION TURNS OFF THE BOOST SWITCHING CIRCUIT. IT SIMPLY          ;
;   TURNS THE TIMER1 OFF SINCE IT HAS BEEN ALREADY SET AT POWER             ;
;   UP.                                                                    ;
;   --------------------------------------------------------------         ;
TURN_OFF_BOOST_SWITCHING:
        IN      R16, TCCR1A             ; READ REGISTER CONTAINING TIMER1 PRESCALER
        ANDI    R16, ~OC1A_MODE         ; DISCONNECT THE OC1A FROM THE BOOST SWITCH
                                        ; IN ORDER TO
        ORI     R16, OC1A_DISCONNECT    ; CONNECT TO THE GENERAL PURPOSE PORT LINE
        OUT     TCCR1A, R16             ; BOOST SWITCHING IS ON . . . .
```

-continued

```
        CBI     PORTB, BOOST_SWITCH_CONTROL
                                                ; MAKE SURE THE BOOST CONTROL MOSFET IS OFF
        RET
                        Subroutine to monitor boosted capacitor's voltage level ;   ---------------------------------------------------------------          ;
;   THIS FUNCTION DIGITIZES AND REPORTS THE VALUE OF A GIVEN                  ;
;   ADC CHANNEL.                                                              ;
;                                                                             ;
;   INPUT    : R18 : CHANNEL TO DIGITIZE                                      ;
;   OUTPUT   : R18 : DIGITIZED VALUE                                          ;
;   ---------------------------------------------------------------          ;
READ_ADC_CHANNEL:
        IN      R16, ADMUX                      ; READ CURRENT ADMUX SETTING
        ANDI    R16, ~ADC_CHANNELS              ; CLEAR THE CHANNEL SETTING
        OR      R16, R18                        ; SET THE MUX CHANNEL
        OUT     ADMUX, R16                      ; DESIRED CHANNEL IS SELECTED
        IN      R16, ADCSR                      ; GET CURRENT ADC CONTROL AND STATUS
        SBR     R16, (1<<ADEN) | (1<<ADSC)      ; ENABLE ADC AND START CONVERSION
        OUT     ADCSR, R16                      ; ADC IS CONVERTING . . . .
RAC_1:                                          ; DO
        SBIS    ADCSR, ADIF                     ; . . CHECK IF ADC DONE CONVERTING
        RJMP    RAC_1                           ; LOOP UNTIL ADC DONE CONVERTING
        IN      R18, ADCH                       ; GET CONVERSION RESULT
        IN      R16, ADCSR                      ; . . READ THE ADC STATUS
        SBR     R16, 1<<ADIF                    ; PREPARE TO CLEAR CONVERSION COMPLETE FLAG
        CBR     R16, (1<<ADEN)                  ; DISABLE THE ADC
        OUT     ADCSR, R16                      ; RESET THE CONVERSION COMPLETE FLAG
```

All publications, prior applications, and other documents cited herein are hereby incorporated by reference in their entirety as if each had been individually incorporated by reference and fully set forth herein.

While the invention has been illustrated and described in detail in the drawings and foregoing description, the same is to be considered as illustrative and not restrictive in character, it being understood that only the preferred embodiments have been shown and described and that all changes and modifications that would occur to one skilled in the relevant art are desired to be protected.

What is claimed is:

1. A valve power control system, comprising:
   an electrically actuated fluid-control valve having a valve state;
   a capacitor in electrical communication with the valve;
   an electrically controlled switch having a first state and a second state;
   a power supply; and
   an inductor configured to receive energy from the power supply when the switch is in the first state, and configured to release energy into the capacitor when the switch is in the second state;
   wherein energy in the capacitor is controllably released to the valve to change the valve state.

2. The system of claim 1, wherein the switch is a transistor.

3. The system of claim 1, further comprising a diode having an anode and a cathode, wherein:
   the inductor has a first terminal and a second terminal;
   the first terminal is electrically connected to the power supply;
   the second terminal is electrically connected to the anode; and
   the cathode is electrically connected to one side of the capacitor.

4. The system of claim 1, further comprising a controller in communication with a memory that is encoded with programming instructions executable by the controller to repeatedly change the state of the switch between the first state and the second state.

5. The system of claim 4, wherein the repeatedly changing continues until the potential across the capacitor is at least about a predetermined potential.

6. The system of claim 4, wherein the programming instructions are further executable by the controller to begin the repeatedly changing at predetermined intervals.

7. The system of claim 6, wherein the predetermined intervals are fixed periods of time independent of the actuation of the valve.

8. The system of claim 6, wherein the predetermined intervals are fixed periods of time after actuation of the valve.

9. The system of claim 4, wherein the programming instructions are further executable by the controller to begin the repeatedly changing after each actuation of the valve.

10. The system of claim 4, wherein the programming instructions are further executable by the controller to begin the repeatedly changing after turning the valve on.

11. The system of claim 4, wherein the programming instructions are further executable by the controller to begin the repeatedly changing after turning the valve off.

12. The system of claim 4, wherein the programming instructions are further executable by the controller to end the repeatedly changing if, a predetermined period of time after the repeatedly changing began, the potential across the capacitor is not at least about the predetermined potential.

13. The system of claim 4, wherein:
   the power supply has a supply potential; and
   the programming instructions are further executable by the controller to disable the system if the supply potential is below a predetermined supply threshold potential.

14. The system of claim 4, wherein the controller is a processor.

15. The system of claim 4, wherein the controller is an ASIC.

16. A method of supplying power to change the state of a fluid-control valve, comprising:

storing electrical energy as a magnetic field in an inductor;

transferring the magnetic field from the inductor as current through a diode;

transforming the current into charge on a capacitor; and releasing the charge to change the state of the valve.

17. The method of claim 16, wherein the storing step draws the electrical energy from one or more dry cells.

18. The method of claim 16, wherein the storing, transferring, and transforming steps are controlled in time by a controller.

19. The method of claim 18, wherein the timing of the releasing step is also controlled by the controller.

20. The method of claim 18, wherein the controller is a processor.

21. The method of claim 18, wherein the controller is an ASIC.

22. The method of claim 16, wherein:

the storing step is accomplished by placing a transistor in a first state; and the transferring and transforming steps are accomplished by placing the transistor in a second state.

23. The method of claim 16, wherein the storing, transferring, and transforming steps are repeated before the releasing step.

24. The method of claim 23, wherein the storing, transferring, and transforming steps are repeated until the potential across the capacitor reaches a predetermined threshold before the releasing step.

* * * * *